(12) United States Patent
Kou et al.

(10) Patent No.: US 9,567,098 B2
(45) Date of Patent: Feb. 14, 2017

(54) DISPLAY SYSTEM FOR AN AIRCRAFT AND ASSOCIATED METHOD

(71) Applicant: DASSAULT AVIATION, Paris (FR)

(72) Inventors: Paul Kou, Paris (FR); Jerome Barral, Paris (FR); Cyril Saint-Requier, Montigny-le-Bretonneux (FR); Eric Boulle, Mouries (FR)

(73) Assignee: DASSAULT AVIATION, Paris (FR)

( * ) Notice: Subject to any disclaimer, the term of this patent is extended or adjusted under 35 U.S.C. 154(b) by 402 days.

(21) Appl. No.: 13/851,667

(22) Filed: Mar. 27, 2013

(65) Prior Publication Data

US 2014/0207314 A1 Jul. 24, 2014

(30) Foreign Application Priority Data

Mar. 27, 2012 (FR) ...................................... 12 00903

(51) Int. Cl.
  *B64D 45/00* (2006.01)
  *G01C 23/00* (2006.01)
  *B64D 43/00* (2006.01)

(52) U.S. Cl.
  CPC ............... *B64D 45/00* (2013.01); *B64D 43/00* (2013.01); *G01C 23/00* (2013.01)

(58) Field of Classification Search
  CPC .......... G01C 23/00; G06F 3/041; B64D 45/00
  USPC ..................................................... 701/3, 14
  See application file for complete search history.

(56) References Cited

U.S. PATENT DOCUMENTS

| | | | |
|---|---|---|---|
| 6,946,976 B1 * | 9/2005 | Langner et al. | 340/971 |
| 7,148,816 B1 * | 12/2006 | Carrico | 340/961 |
| 7,191,406 B1 | 3/2007 | Barber et al. | |
| 8,564,536 B2 * | 10/2013 | Detouillon | 345/157 |
| 8,768,541 B2 * | 7/2014 | Detouillon et al. | 701/3 |
| 2001/0056316 A1 * | 12/2001 | Johnson et al. | 701/14 |
| 2008/0231634 A1 * | 9/2008 | Gyde et al. | 345/427 |
| 2010/0113149 A1 * | 5/2010 | Suddreth et al. | 463/31 |
| 2010/0166385 A1 * | 7/2010 | Okuda et al. | 386/83 |
| 2012/0029739 A1 * | 2/2012 | Chen et al. | 701/14 |

FOREIGN PATENT DOCUMENTS

| | | |
|---|---|---|
| EP | 2161650 A1 | 3/2010 |
| WO | 2004037643 A1 | 5/2004 |
| WO | 2010004114 A2 | 1/2010 |

OTHER PUBLICATIONS

French search report for application No. 1200903 dated Mar. 7, 2013.

* cited by examiner

*Primary Examiner* — Yonel Beaulieu
*Assistant Examiner* — Martin Weeks
(74) *Attorney, Agent, or Firm* — Davidson, Davidson & Kappel, LLC

(57) ABSTRACT

The system includes additional display means including at least one additional screen and additional graphic interface handling means of the additional screen (able to display on the additional screen, a summary window depending on the operational state of the aircraft. The summary window comprises at least one first pictogram able to be displayed on a first display window of main display means of the aircraft without being displayed on the second window of the main display means, and at least one second pictogram intended to be displayed on the second display window of the main display means without being displayed on the first window of the main display means.

16 Claims, 8 Drawing Sheets

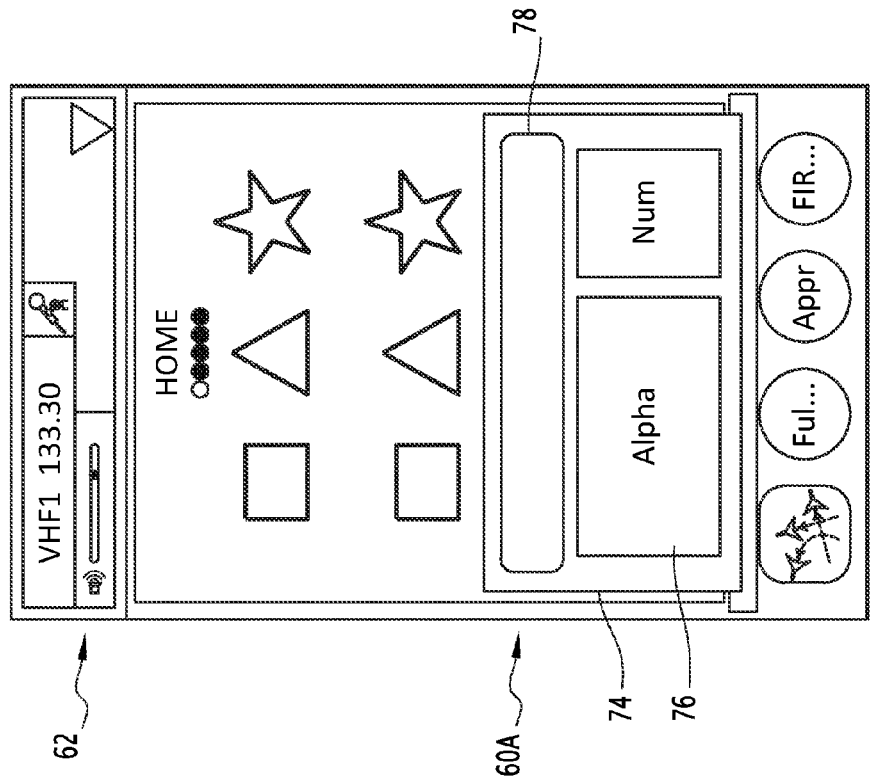
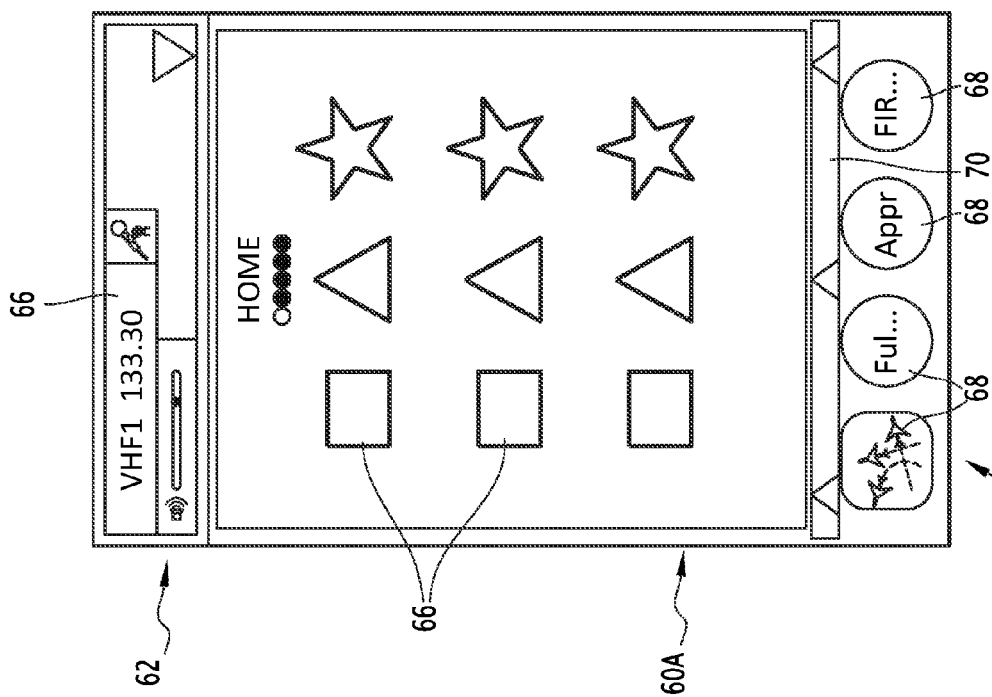

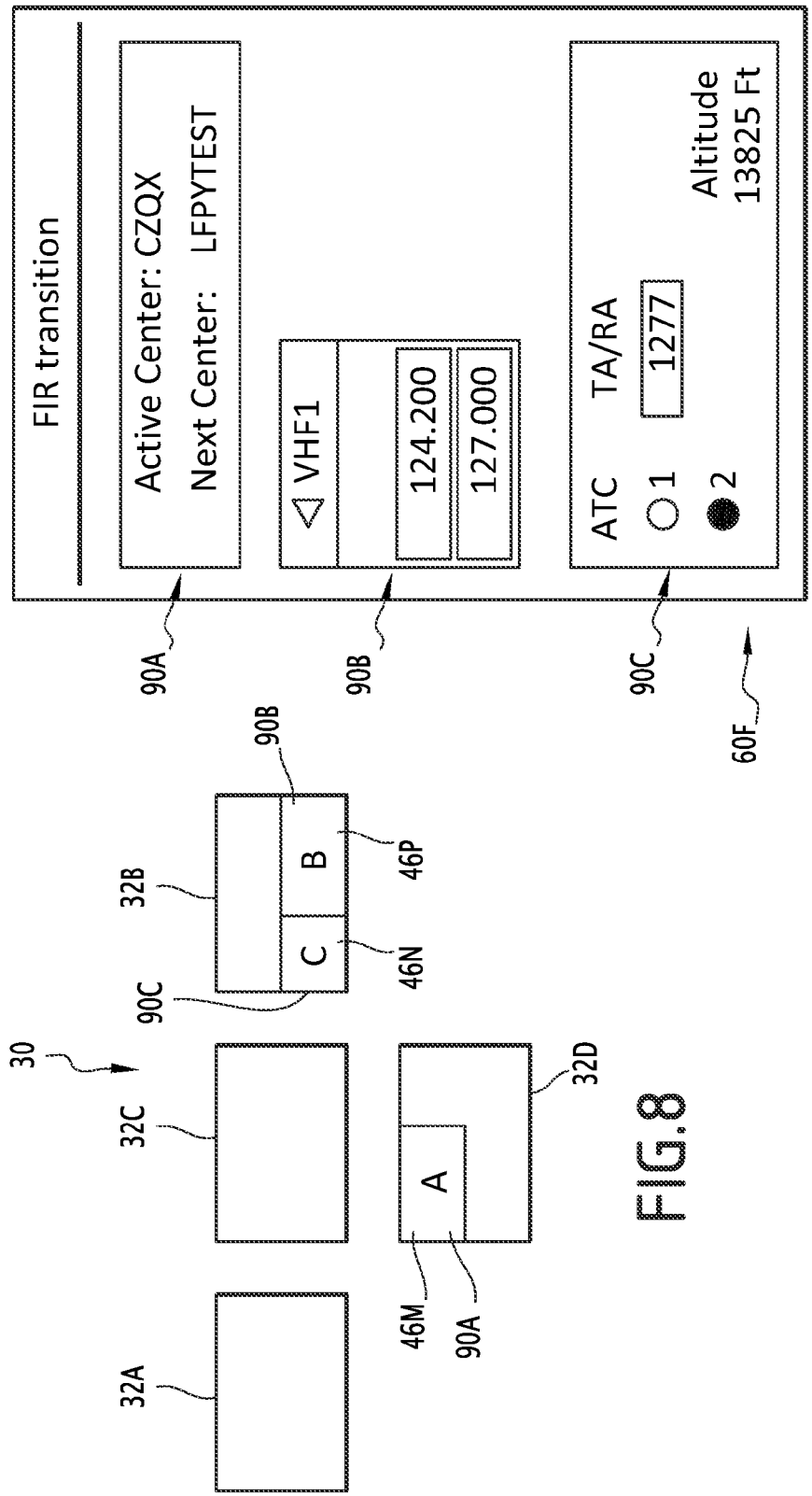

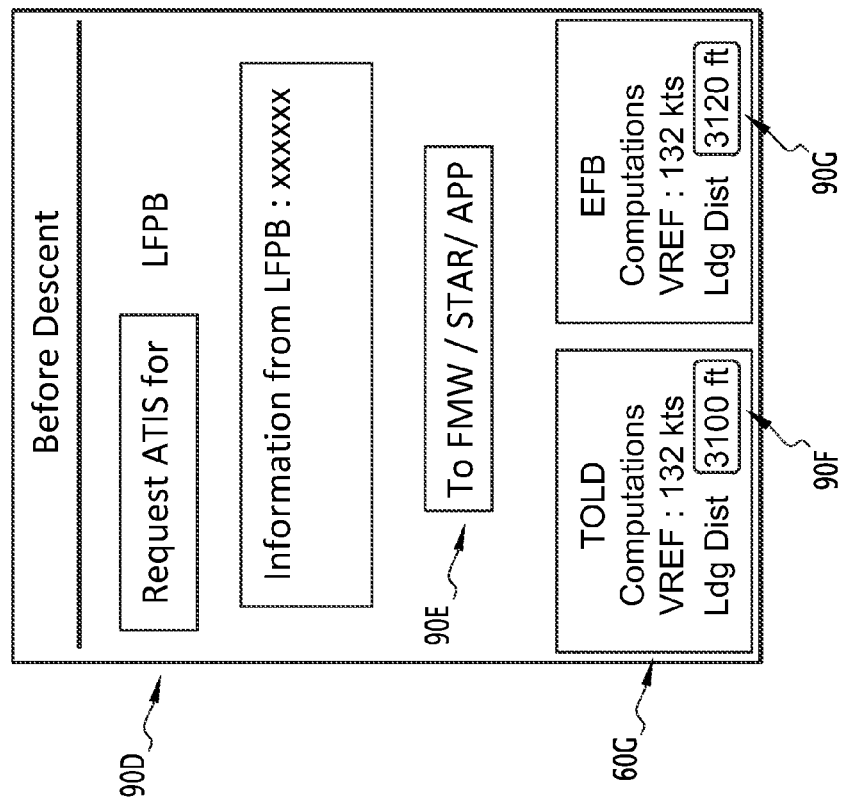

DISPLAY SYSTEM FOR AN AIRCRAFT AND ASSOCIATED METHOD

BACKGROUND OF THE INVENTION

Field of the Invention

The present invention relates to a display system for an aircraft comprising main display means including:

at least one basic screen, and means for handling the graphical interface of said or each basic screen, the handling means being able to display separately on the main display means at least one first display window and at least one second display window, each display window displaying at least one pictogram representative of a parameter and/or of a control of the aircraft.

Description of the Related Art

Such a display system is intended to be placed in the cockpit of an aircraft for assisting the crew of the aircraft with the handling and flying of the aircraft.

In a known way, the display systems present in the cockpit of aircraft comprise screens for displaying flight parameters, such as the altitude, the horizontal situation, the air speed, the vertical speed, the corrected air speed (CAS), information relating to the engine, and to the sustentation configuration of the aircraft.

The information is generally represented on a screen called a Primary Display Screen (or Primary Display Unit) placed facing each pilot.

Moreover, a known display system further comprises one or more multi-functional screens intended for displaying pictograms representative of the navigation parameters of the aircraft, as well as pictograms representative of the parameters or of the controls of functional systems of the aircraft.

The navigation parameters of the aircraft for example include topographical data, approach data, information on the heading, on the beacons, and more generally on the positioning of the aircraft relatively to the ground.

The data relating to the functional systems notably include displays of parameters measured on the different hydraulic, electric, propulsion systems or on avionic systems of the aircraft, such as engine pressures, temperatures and states of the avionic systems.

Taking into account the large number of parameters to be displayed on the multi-functional screens, the pictograms are distributed in several selectively displayable windows by one or several screens. In order to access these different windows, the user of the display system generally uses a control member associated with this screen. He/she navigates between the different windows according to a pre-defined tree structure.

For this purpose, the device system generally includes a man/machine interface for example formed by a keyboard and/or a control member of the mouse type allowing access to the different windows. Each of the members of the crew generally has his/her own interface for being able to manipulate the data present on the multi-functional screens and navigate between the different windows.

Taking into account the complexity of the systems present on an aircraft, and the navigation software packages to be manipulated, the pilots have to be able to easily navigate rapidly between the different menus, in order to apply adequate procedures during the different flight phases. Navigation between the windows is further made necessary during possible malfunctions occurring on the aircraft.

For this purpose, although the ergonomics of use of the screens and windows is carefully predefined, it is sometimes complex to again find a specific functionality required by a given procedure during a flight phase, notably when the crew has other tasks to be carried out, or when the task has to be carried out rapidly and in a specific order.

In order to simplify the work of the crew, U.S. Pat. No. 7,191,406 describes a display system which, by simply pressing on different buttons, allows display of the windows corresponding to given flight phases, for example an ascent phase, a cruising phase, and a descent phase of the aircraft. The pieces of information required for piloting the aircraft in each of these phases are therefore arranged per categories depending on the flight phase, which gives the possibility to the pilots, by actuating a simple button, of accessing a large number of relevant data.

However, such a display system does not give entire satisfaction. Indeed, there remains a large number of operational situations in which the crews have to move on with a plurality of control or verification actions which have to be carried out on dispersed windows and/or screens through the display system.

SUMMARY OF THE INVENTION

An object of the invention is therefore to provide a display system allowing simplification of the task of the crew, notably when an operational situation occurs in which a large number of control and verification actions have to be carried out by using diverse systems of the aircraft.

For this purpose, the object of the invention is a display system of the aforementioned type, characterized in that the system includes additional display means including:

at least one additional screen; and additional means for handling the graphic interface of the additional screen capable of displaying on the additional screen, a summary window depending on the operational state of the aircraft, the summary window comprising at least one first pictogram capable of being displayed on the first display window of the main display means without being displayed on the second window of the main display means, and at least one second pictogram intended to be displayed on the second display window of the main display means without being displayed on the first window of the main display means.

The display system according to the invention may comprise one or more of the following features, taken individually or according to all technically possible combinations:

the main display means comprise a first basic screen and a second basic screen, distinct and away from the first basic screen, the handling means being able to display the first display window on the first basic screen and to separately display the second window on the second basic screen;

the first basic screen is a primary piloting screen able to display pictograms representative of piloting parameters of the aircraft, the second basis screen being a multi-functional screen able to display pictograms representative of the navigation of the aircraft and/or of the handling of systems of the aircraft;

the main display means comprise a first basic screen, the handling means being able to display the first window on the first basic screen, and to display the second window on the first basic screen as a replacement of or an addition to the first window, advantageously upon interaction of a user with a control member of the display of the first basic screen;

the additional interface handling means are able to display a first summary window comprising a first set of pictograms stemming from two separate windows of the main display means in a first operational state of the aircraft, and a second summary window comprising a second set of pictograms stemming from two separate windows of the main display means in a second operational state of the aircraft, the first set of pictograms being different from the second set of pictograms;

the additional interface handling means comprise means for detecting a current operational state of the aircraft and automatic switching means able to automatically switch the display on the additional screen from the first summary window towards the second summary window depending on the operational state detected by the detection means;

the additional handling means are able to selectively display in the same operational state of the aircraft, at least one first summary window and at least one first additional summary window, the auxiliary display means comprising a means for selection by a user of the first summary window and/or of the first additional summary window;

the additional interface handling means are able to display on the additional screen a man/machine dialog interface, such as an alphanumerical keyboard;

the additional graphic interface handling means are able to display on the additional screen, independently of the operational state of the aircraft, at least one predefined window of pictograms representative of flight parameters and/or controls;

each pictogram is representative of a flight parameter and/or control selected from an alphanumerical and analog indicator of a flight parameter, a virtual button able to actuate a control of a system of the aircraft, a short cut for accessing another window, a path for accessing documentation, or/and a field for inputting alphanumerical data;

the additional screen is a touchscreen, for example borne by a tablet, at least one pictogram displayed on the additional screen being able to be tactily selected by a user of the additional screen.

The object of the invention is also a display method for an aircraft, comprising the following steps:

providing a system as described above;

displaying a first display window on at least one basic screen, the first display window displaying at least one pictogram representative of a parameter and/or a control of the aircraft;

in an given operational state of the aircraft, displaying on the additional screen a summary window depending on the operational state of the aircraft, the summary window comprising at least the first pictogram displayed on the first display window without being displayed on a second display window of the main display means and at least one second pictogram intended to be displayed separately on the second display window of the main display means, without being displayed on the first display window of the main display means.

The method according to the invention may comprise one or more of the following features, taken individually or according to all technically possible combinations:

in a first operational state of the aircraft, the additional interface handling means display a first summary window comprising a first set of pictograms stemming from two separate display windows of the main display means, and in a second operational state of the aircraft, the additional interface handling means display a second summary window including a second set of pictograms stemming from two separate display windows of the main display means, the first set of pictograms being different from the second set of pictograms;

it includes the display of the first display window on a first basic screen of the main display means, and the separate display of the second display window on a second basic screen of the main display means, distinct from the first basic screen, the additional means for handling the graphic interface displaying on the additional screen a summary window comprising at least one first pictogram displayed on the first display window and at least one second pictogram displayed on the second display window;

the main display means display a first display window on a first basic screen, a second display window being able to be displayed on the first basic screen by the means for handling the graphic interface as a replacement of or as an addition to the first display window, the additional means for handling the graphic interface of the additional screen displaying on the additional screen a summary window comprising a first pictogram displayed on the first display window of the main display means and a second pictogram intended to be displayed on the second display window of the main display means without being displayed on the first display window of the main display means;

the operational state of the aircraft is selected from a transitional state between two air control centers, a preparation state for a descent phase towards a landing runway, a preparation state for entering an air control area with specific requirements, notably in an ocean space, the detection of a deviation between two redundant sensors on the aircraft, notably the detection of a deviation observed between a displayed piece of information on one flight parameter on a first primary screen and on a same flight parameter on a second primary screen, both parameters stemming from two distinct redundant sensors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading this description which follows, only given as an example and made with reference to the appended drawings wherein:

FIG. 2 is a view of an additional screen of the display system according to the invention, on which a first basic desktop is displayed;

FIG. 3 is a view similar to FIG. 2, wherein a man/machine interface is activated;

FIG. 8 is a schematic view of the main display means of the display system according to the invention, wherein different windows to be activated upon a change in air control center are illustrated;

FIG. 9 is a view of a first summary window displayed on the additional screen grouping pieces of information from different separate windows of the system of FIG. 8;

FIG. 10 is a view similar to FIG. 8 illustrating different windows to be activated during a phase for preparing initiation of descent of the aircraft;

FIG. 11 is a view similar to FIG. 9 of a second summary window corresponding to different pictograms displayed during the preparation of initiation of descent;

DETAILED DESCRIPTION

Figure 1:
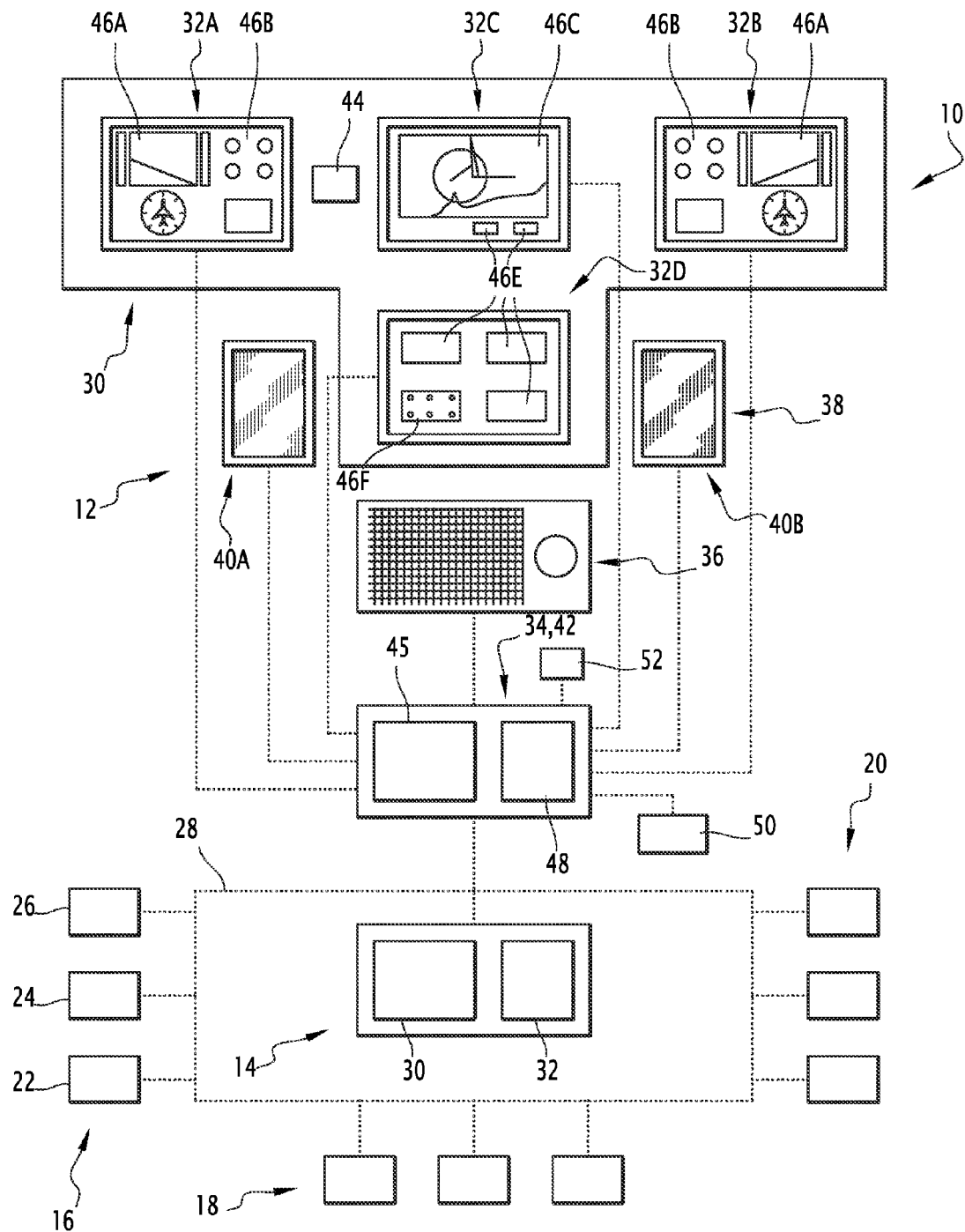
FIG. 1 is a schematic view of a first display system according to the invention positioned in an aircraft.

A first display system 10 according to the invention is illustrated by FIG. 1. This system 10 is intended to be placed in the cockpit 12 of an aircraft, in order to allow the crew of the aircraft to pilot the aircraft, to handle its navigation, to monitor and control the different functional systems present in the aircraft.

The aircraft is provided with an avionics central control unit 14. The unit 14 is connected to systems 16 of measurement sensors on the aircraft, to outer communication systems 18, and to systems 20 for actuating the controls of the aircraft.

The measurement systems 16 for example include sensors 22 for measuring exterior parameters of the aircraft, such as the temperature, the pressure or the speed, sensors 24 for measuring internal parameters of the aircraft, and of its different functional systems and positioning sensors 26, such as GPS sensors, inertial units, and/or an altimeter.

The outer communications systems 18 for example include VOR/LOC, ADS, DME, ILS, NLS radio systems and/or radar systems.

The control systems 20 include diverse actuators able to actuate controls of the aircraft, such as flaps, control surfaces, pumps, or further mechanical, electrical and/or hydraulic circuits, on the one hand, and diverse software actuators capable of configuring the avionic states of the aircraft on the other hand.

The different systems 16, 18 and 20 are connected to the central control unit 14, for example digitally, through at least one data bus circulating on an internal network 28 of the aircraft.

The central unit 14 includes at least one computer 30 and one memory 32 capable of receiving information from the different systems 16, 18, 20 and of processing them, and optionally controlling the systems 20 for executing flight commands.

As illustrated by FIG. 1, the display system 10 includes at least main display means 30 including at least one basic screen 32A-32D and means 34 for handling the graphic interface of each basic screen 32A-32D.

Advantageously, the main display means 30 further include a man/machine interface 36 present in the cockpit 12.

According to the invention, the system 10 further includes additional display means 38 including at least one additional screen 40A, 40B and additional means 42 for handling the graphic interface of each additional screen 40A, 40B.

In the example illustrated in FIG. 1, the handling means 34 and the additional handling means 42 are formed with the same unit. Alternatively, these means 34, 42 are formed with distinct units.

In the example illustrated in FIG. 1, the main display means 30 include at least two basic screens 32A, 32B located on either side of the cockpit 12, intended to be placed facing each crew member, and at least two central screens 32C, 32D intended to be placed between the crew members, and between the screens 32A, 32B. The main display means 30 thus have the general shape of a T.

The main display means 30 generally comprise at least one backup screen 44 intended to display the data of a backup instrument.

Each screen 32A-32D is connected to handling means 34 so as to be driven by the handling means 34.

The handling means 34 include at least one processor 45 and one memory 48.

The memory 48 receives a data base storing a plurality of display windows 46A-46E intended to be selectively displayed on one or several screens 32A-32D.

Thus, the processor 46 of the handling means 34 is able to drive each of the screens 32A-32D so that it displays at least one display window 46A-46F comprising pictograms. Each window 46A-46F is able to be displayed on a screen 32A-32D.

The windows 46A-46F are for example frames in which are displayed pictograms. They occupy all or part of the screens 32A-32D on which they are intended to be displayed.

At least one portion of the windows 46A-46F is intended to be permanently displayed during normal operation of the aircraft, regardless of the operational state of the aircraft.

Certain windows 46A-46F are able to be selectively displayed by the user. Notably by actuating a control member present on the man/machine interface 36 or directly by action on a screen 32A-32D.

The pictograms displayed on the windows 46A-46E are selected from alphanumerical indicators, analog indicators such as gauges, controls which may be actuated by the user, for example by selecting the control by means of a control cursor or by touching symbols or icons capable of forming a short cut for displaying another window distinct from the present window, and/or fields of inputting alphanumerical data.

In the example illustrated in FIG. 1, the basic screen 32A, 32B are primary display screens intended for displaying flight parameters of the aircraft.

The handling means 34 permanently display on each primary screen 32A, 32B at least one window 46A, 46B having at least one of the following pictograms: altitude indicator, horizontal situation indicator, air speed, altitude, vertical speed, corrective air speed, engine information, sustentation configuration of the aircraft.

The basic screen 32C and 32D are multi-functional navigational screens and/or multi-functional screens for tracking and controlling of avionic systems.

The navigations windows 46A-46F displayed on the multi-functional screens 32C for example include pictograms selected from navigation display data from a storage data base 50 connected to the handling means 34, vertical and horizontal situation indicators, heading indicators, and positioning indicators relatively to reference points on the ground such as radio beacons. The display windows 46C also comprise systems for displaying radar data sensed by the aircraft.

The windows 46A-46F displayed on the lower screen 32D generally comprise pictograms selected from numerical indicators relating to different parameters measured on the systems of the aircraft, representation and control diagrams of different hydraulic, electric, mechanical or avionic systems present on the aircraft, present fuel level indicators, and optionally windows for displaying procedures to be carried out, from a data base 52 of aircraft procedures (for example designated by the term of <<Electronic Flight Book>>).

At least one screen 32A-32D is also capable of displaying status messages of the aircraft, such as alert or emergency messages.

A portion of the windows 46A-46F present on the screen 32C, 32D is able to be replaced with other windows stored in the data base 40 and invisible on the screen 32C, 32D when the windows 46C, 46E and 46F are visible on the screen.

The switching from a visible window 46C-46F to an invisible window is carried out for example by acting on a control button present on the man/machine interface 36, by selecting an activatable area on one of the screens 32C, 32D by means of a cursor driven by the interface 36, or by tactile direct action on one of the screens 32C, 32D.

In an embodiment, the man/machine interface 36 is formed with a mechanical keyboard, and/or a control member such as a mouse present in the cockpit 12, for example under the screens 32C, 32D.

Alternatively, the man/machine interface 36 is directly formed with the tactile nature of the screen 32A-32D, and/or, according to the invention by the additional display means 38, as this will be seen below.

As illustrated by FIG. 1, the additional display means 38 include at least one additional screen 40A, 40B, and additional means 32 for handling the graphic interface of each screen 40A, 40B.

According to the invention, the additional handling means 42 are able to display on said or each additional screen 40A, 40B at least one summary window depending on an operational state of the aircraft. As this will be seen in detail below, the summary window groups at least one pictogram present on a first window 46A-46F of the main display means 30 and a second pictogram present on a second window 46A-46F, intended to be separately displayed from the first window 46A-46F, either on different screen 32A-32D, or on the same screen 32A-32D, but not simultaneously with the first window.

Advantageously, each additional screen 40A, 40B is formed with a touchscreen which may be directly actuated by touching by a user. The touchscreen is preferably mounted removably in the cockpit 12. It is able to be manually detached away from the main display means 30 without having to use a disassembling tool.

Each screen 40A, 40B is able to also form a man/machine interface, notably an alphanumerical keyboard intended for carrying out the same functions as the interface 36, or for totally replacing the interface 36.

An example for applying the additional display means 38 will now be described with reference to FIGS. 2 to 15.

In the particular example illustrated in FIGS. 2 to 7, the additional handling means 42 are advantageously capable of displaying on each additional screen 40A, 40B at least one window forming a desktop 60A-60E selectable by the user, at least one permanent window 62 visible regardless of the desktop 60A-60E displayed by the user and at least one control panel 64 visible independently of the desktop 60A-60E displayed by the user.

The permanent window 62 is able to display pictograms 64 independently of the operational state of the aircraft, and of the desktop 60A-60E displayed on the additional screen 40, 40B.

In the example illustrated in FIG. 2, the pictograms 54 displayed on the permanent window 62 are for example a radio indicator, such as a VHF frequency, a button for controlling a microphone and a button for controlling the sound.

The permanent window 62 may be opened by the user in order to display instead of the desktop 60A-60E and above it, a plurality of normally hidden areas, each area comprising additional pictograms 54.

The control panel 64 includes a plurality of navigation buttons 68 allowing the user to pass from one desktop 60A-60E to another. It further includes an activation area 70 of a man/machine interface such as an alphanumerical keyboard.

When a user presses on the activation area 70, additional means 42 for handling the graphic interface display an interface window 74 comprising an alphanumerical keyboard 76 and advantageously an area 78 for reading information input on the keyboard 76 by a user.

In the example illustrated in FIG. 2, at least one desktop 60A able to be displayed by the additional handling means 42 is a basic desktop. This basic desktop 60A includes a plurality of pictograms 66 for example formed by control icons intended to display selected windows. These icons 66 are advantageously programmable by the user and stored in the memory. They may be selected notably by the operator touching the icon.

Figure 4:
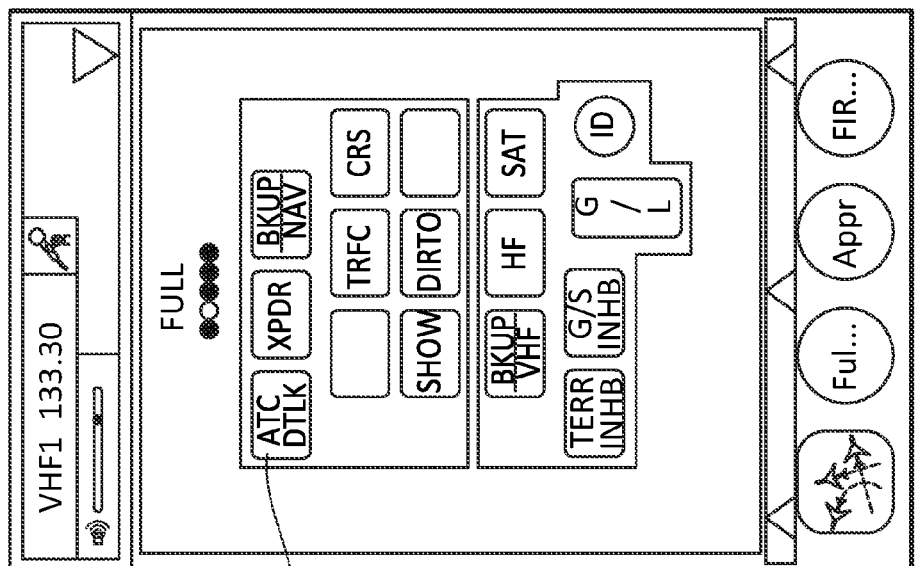
FIG. 4 is a view similar to FIG. 2, wherein a control desktop is displayed.

With reference to FIG. 4, at least one second desktop 60B able to be displayed by the additional means 42 includes a set of virtual control buttons allowing control of the display of different configurations of windows 46A-46E on the main display means 30.

The control buttons 80 may be activated, for example by selecting a cursor or directly by pressing on the screen 40A, 40B.

Figure 5:
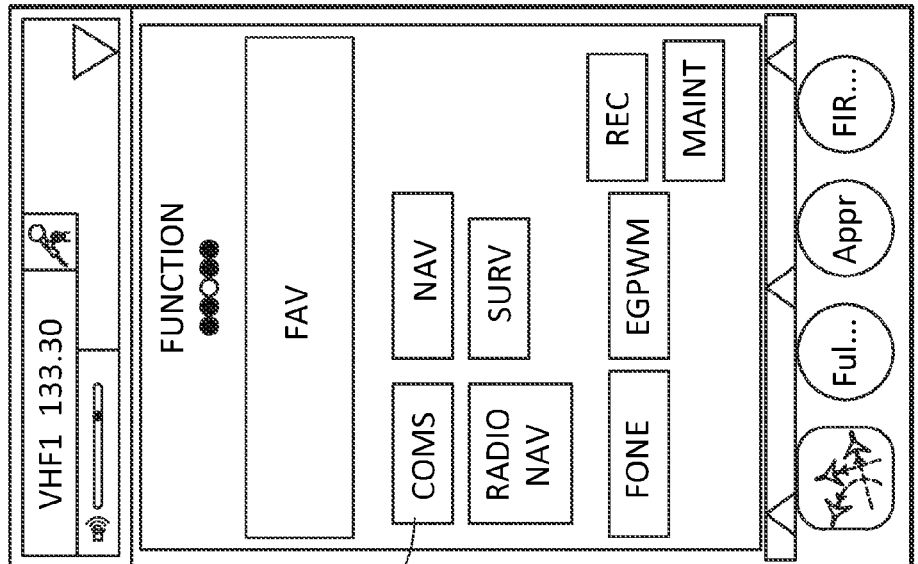
FIG. 5 is a view similar to FIG. 4, wherein a desktop including short cuts towards favorite controls is displayed.

With reference to FIG. 5, the desktop 60C is a desktop which may be customized by the user including a certain number of control buttons 82 giving access either to a selection menu or to an action menu, or to a dialog box, or to a specific page. The buttons 82 give access to menus grouping different functional families of the aircraft, for example communications, navigation, radio navigation, monitoring of the aircraft, etc.

Figure 7:
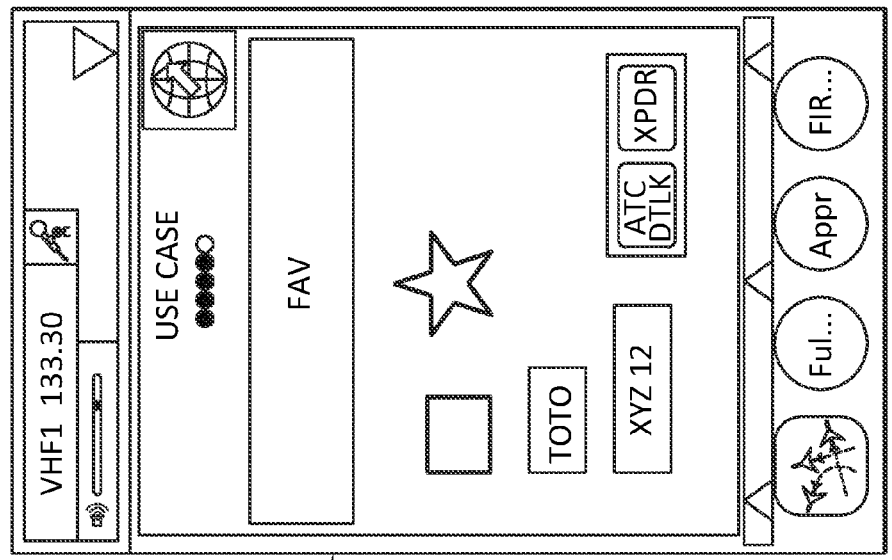
FIG. 7 is a view similar to FIG. 6 illustrating a desktop for displaying a set of pictograms capable of being displayed separately on different windows of the main screens, in a summary window.
Figure 6:
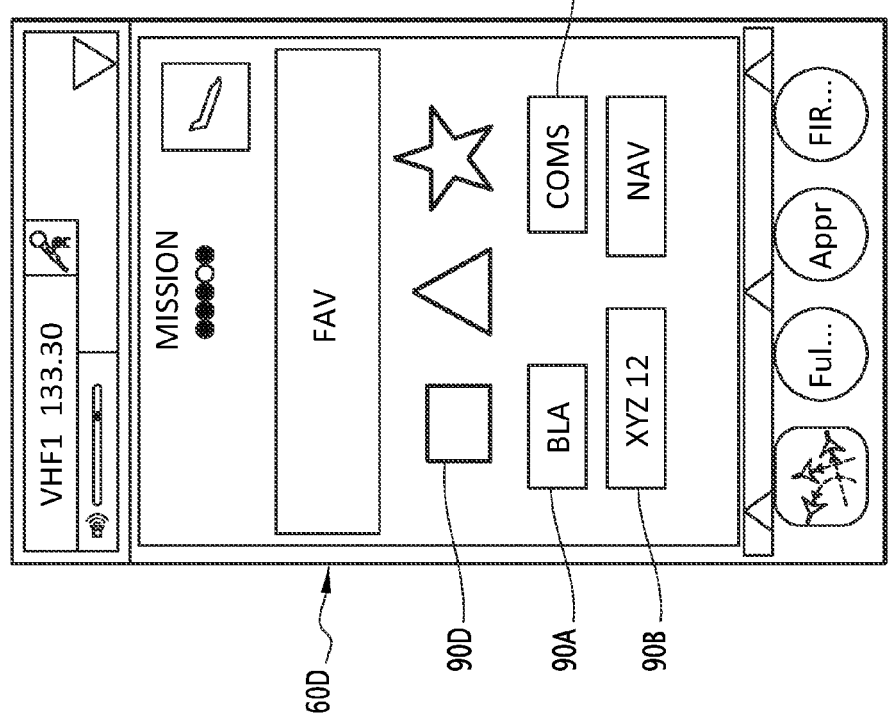
FIG. 6 is a view of a desktop representative of different flight configurations of the aircraft.

As illustrated by FIG. 6 and by FIG. 7, according to the invention, the additional interface handling means 42 are able to display at least one summary window 60D, 60E depending on the operational state of the aircraft, this summary window grouping pictograms which may be displayed separately on distinct windows of the main display means 30.

By <<operational state of the aircraft>>, is meant a particular mission phase as illustrated on the desktop 60D or a particular event within a mission, for example generated by a future modification of a mission phase, a change in the navigation configuration, or by a malfunction on the aircraft.

The mission phase is for example a flight phase, such as a take-off phase, a cruising phase, or a landing phase of the aircraft.

Alternatively, the mission phase is a ground phase, such as a parking phase or a taxiing phase.

The navigation configuration difference may result from passing from one air control center to another or passing into an air control area with specific requirements, such as an ocean area.

Alternatively, the future modification of a mission phase may be the preparation for initiating descent or preparation for arrival in a stationary flight.

The occurrence of a malfunction in the aircraft may for example result from the occurrence of conflicting data between two redundant sensors of the aircraft.

Advantageously, the additional handling means 42 include means for detecting the operational state of the aircraft and means capable of automatically switching the display of a summary window depending on the operational state of the aircraft detected by the detection means, and notably upon passing from a first operational state of the aircraft to a second operational state of the aircraft.

Alternatively, the system includes control means, in a first operational state of the aircraft for a summary window intended to be displayed in a second operational state of the aircraft when the second operational state is not detected by the detection means. These means for example comprise an icon or a symbol displayed on the additional screen 40A, 40D.

In still another alternative, several summary windows are able to be displayed in a given operational state, the additional handling means 42 then including a means for selecting the summary window to be displayed by a member of the crew.

As specified above, each summary window 60D, 60E includes at least one first pictogram 90A-90C intended to be displayed on a first window 46A-46F of the main display means 30, and at least one second pictogram 90A-90C intended to be displayed on a second window 46A-46F of the main display means 30.

The first window 46A-46F and the second window 46A-46F are for example displayed simultaneously on two distinct screens 32A-32D of the main display means 30.

Alternatively, the first window 46A-46F and the second window 46A-46F are able to be displayed selectively on the same basic screen 32A-32D, both windows not being displayable simultaneously.

Thus, in both aforementioned cases, the first window and the second window are displayed separately either on two separate screens or on the same screen, but not simultaneously.

As illustrated by FIGS. 6 and 7, the pictograms 90A-90C are for example direct controls, alphanumerical or analog indicators of parameters of the aircraft, or icons capable of driving the display of another window on the additional screen 40A, 40B, or/and on the main display means 30, or further alphanumerical input fields.

As illustrated by FIG. 6, at least one portion of the pictograms 90D may further be parameterizable by the user.

The pictograms 90A-90B displayed on each summary sheet 60D are adapted to the detected operational state of the aircraft and allow the crew to have available data required for this operational state, without having to navigate over the windows displayed on the basic screen 32A-32D.

A first example of application of a display method according to the invention applied by means of the display system 10 will now be described, with reference to FIGS. 8 and 9.

This example corresponds e.g. to a change in the operational state of the aircraft in preparation of a phase when the aircraft passes from a first air control area to a second air control area.

The detection of the change in operational state is carried out for example relatively to the position of the airplane on the flight plan or to a <<datalink>> message of the <<Next Data Authority>> or <<AFN Contact Advisory>> type preparing the transition between two air control areas.

In preparing this phase and when the detection means detect that the change of control center will soon be performed, the additional means 42 display a summary window 60F visible in FIG. 9. The window 60F groups a plurality of pictograms 90A, 90B, 90C visible on separate windows 46M, 46N, 46P, of the main display means 30, schematically illustrated in FIG. 8.

Thus, at least one pictogram 90A is representative of a piece of information displayed on a first window 46M of a basic screen 32D for example intended to form a multifunctional screen. At least one second pictogram 90B, 90C displayed by the additional means 42 on the additional screen 40 is displayed on respective windows 46N, 46P of a basic screen 32B distinct from the basic screen 32D.

In particular, in the illustrated example, the first pictogram 90A illustrates the presently active air control center, and the one intended to become active.

The second pictogram 90B is a digital indicator indicating the radio frequency for voice transmission, and also a control member allowing switching from one radio frequency to another.

The third pictogram 90C is a control member allowing the transponder code to be changed in order to comply with a request from the new control center.

The summary window 60F therefore allows a crew member to carry out actions required for passing from a first operational state of the aircraft to a second operational state of the aircraft and to control this switching without having to seek information and/or distinct controls on different screens 32B, 32D of the main display means 30.

A second example for applying the display method according to the invention is illustrated by FIGS. 10 and 11.

This method is intended to be applied upon a change in the operational state of the aircraft with view to preparing a descent phase.

This change is automatically detected by the additional means 42 on the basis of a position of the airplane on the flight plan, on the basis of the distance given relatively to a fixed point for initiating descent, on the basis of an estimated time period before the fixed descent point, or on the basis of an air control message authorizing initiation of descent.

A summary window 60G is then displayed on the additional screen 40A, 40B by the additional means 42. This window groups different pictograms 90D, 90E, 90F, 90G intended to be displayed on different windows 46Q-46S of at least one basic screen 32D.

For this purpose, a first pictogram 90D displayed on the summary window 60G corresponds to information visible on a first window 46Q of a first basic screen 32D.

A second pictogram 90E corresponds to a short cut towards a second window which may be displayed on the same screen 32D by switching and replacing the first window 90Q with the second window 46R. The third pictogram 90F corresponds to a field displayed on a third window 46S which may be displayed on the screen 32D as a replacement of the first window 46Q, or of the second window 46R by switching.

The fourth pictogram 90G corresponds to a piece of information which may be obtained on paper documentation 92 or in an electronic documentation database 52 of the EFB <<Electronic Fly Bag>> type.

Thus, the first pictogram 90D allows the crew to search for an automatic traffic information service of the destination airport directly on the screen 40A, 40B. The second pictogram 90E allows the crew to display on the screen 32D, a window 46R allowing the parameters of the approach to be given in.

The third and fourth pictograms 90F, 90G give the possibility of checking whether the performance calculations of this flight tracking window 46R are correct, by comparing the calculated values on this window 46R with those which are tabulated in the database 52.

Figure 13:
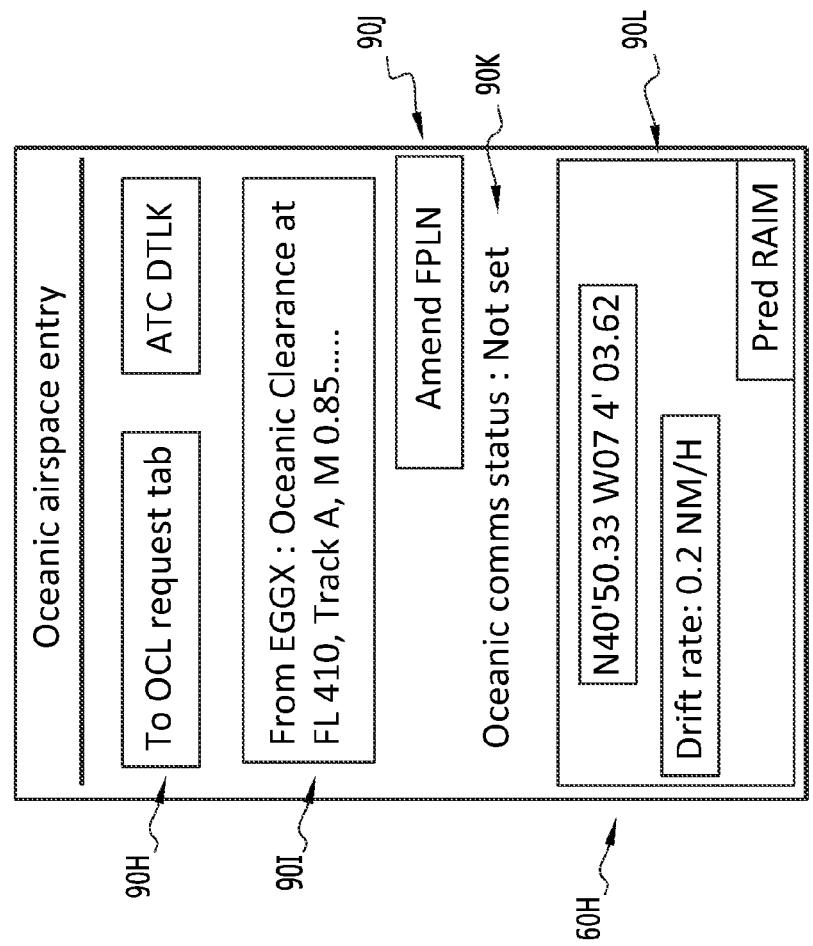
FIG. 13 is a summary window view visible on the additional screen upon preparing entry of an ocean space.
Figure 12:
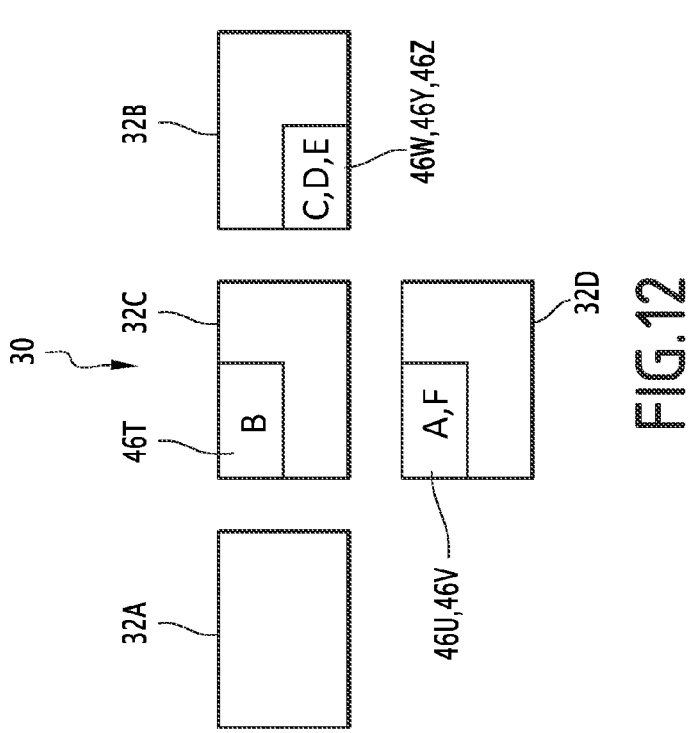
FIG. 12 is a view similar to FIG. 8 illustrating different windows to be activated during a phase for preparing entry of an ocean space.

A third example for applying a display method according to the invention is illustrated by FIGS. 12 and 13.

The method is applied notably upon preparing for passing into an air control area with specific requirements, such as entering an ocean space.

Passing into this operational state is automatically detected by the additional means 42 on the basis of the position of the airplane and of the flight plan, or else on the basis of the distance and/or a time period before entering an air control area with specific requirements.

A third summary window 60H is then displayed by the additional means 42 on the additional screen 40. As earlier, this window includes pictograms 90H, 90I, 90J, 90K and 90L repeated on different windows 46T-46Z separately visible on basic screens 32A-32D of the main display means 30.

Thus, the pictograms 90H form short cuts allowing selective display of one of the windows 46U, 46V on the screen 32D.

The pictogram 90I displays information present on a window 46T of the screen 32C of the flight tracking system. The window 90J is a short cut allowing the window 46P to be displayed on the screen 32C in the case when this window would not be displayed.

The pictogram 90K is an alphanumerical indicator resulting from several pieces of information displayed on the windows 46W, 46Y, 46Z which may be separately switched on the screen 32B.

The pictogram 90L repeats the geographic information present on one of the windows 46Y of the screen 32B, which cannot be displayed simultaneously with other windows 46W, 46Z of this same screen 32B.

Thus, by pressing on the pictogram 90H, the crew member may obtain ocean consent from the adequate control center.

And then, by checking the information present on the pictogram 90I, the crew member may then activate the pictogram 90J in order to update the flight plan with the obtained consent.

The crew member may then check on the pictogram 90K whether the HF radio is operational.

He/she may then note on the pictogram 90L, the position and the present date and the drift rate of the inertial units in order to perform a calculation for assessing receiver autonomous integrity (designated by the acronym RAIM).

He may then come back to the pictogram 90K for configuring the communications means and carrying out certain operations for connecting to a control center by pressing one of the icons 90H present on the summary window 60H.

Figure 15:
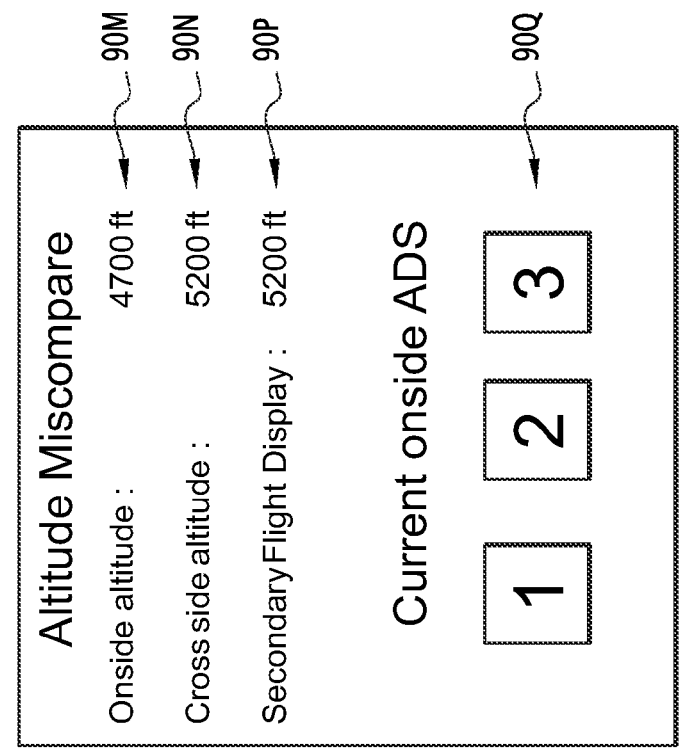
FIG. 15 is a view similar to FIG. 9 illustrating a summary window displayed upon detecting an altitude deviation between the left station and the right station.
Figure 14:
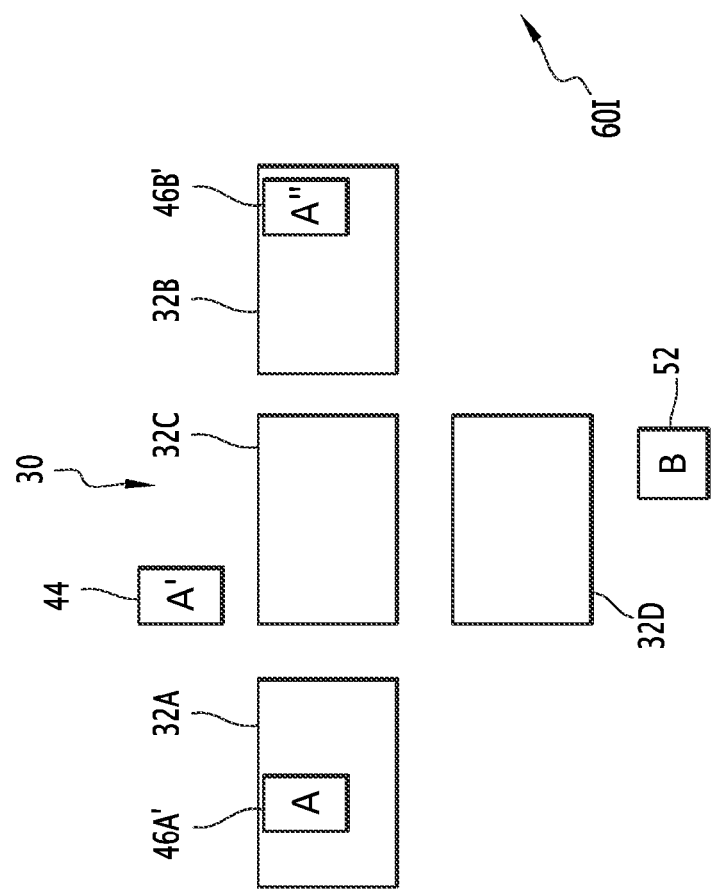
FIG. 14 is a view similar to FIG. 8 illustrating the window to be activated upon detecting an altitude deviation between the left station and the right station.

Another example of application of the display method according to the invention is illustrated by FIGS. 14 and 15.

This method is applied when two redundant sensors present on the aircraft give different information.

The additional display handling means 62 then display a fourth summary window 60I on the additional screen 40A, 40B. This fourth window 60I includes a first pictogram 90M, a second pictogram 90N, and a third pictogram 90Q.

The first and second pictograms 90M and 90N exhibit information displayed on two windows 46A' and 46B' respectively displayed on the basic screens 32A, 32B located on either side of the cockpit. In particular, the window 46A' displays information relating to a first measurement sensor on the aircraft, while window 46B' displays information relating to a second sensor of the aircraft, redundant with the first sensor.

The pictograms 90M and 90N therefore display information of similar nature (for example altitudes), but different information, since they stem from distinct measurement sensors. The first pictogram 90M giving a piece of information relating to the first measurement sensor is therefore only displayed on the first window 46A' without being displayed on the second window 46B'. The second pictogram 90N giving a piece of information resulting from the second measurement sensor is only displayed on the second window 46B' without being displayed on the first window 46A'.

The backup screen 44 moreover displays a piece of information which is repeated by the pictogram 90P. The summary window 60I thus displays three pieces of information from three different sensors on the same screen, which allows the crew member to identify the sensor giving faulty information.

Further, the window 60I includes a fourth pictogram 90Q formed by a switch allowing the unit to be switched onto the sensor estimated to be reliable.

Such a switch is generally present in the cockpit on a reversion panel.

When a conflict is observed between the data provided by several sensors, the additional means 42 display the summary window 60I on the additional screen 40A, 40B.

The crew member compares the data provided by the different sensors with those of the backup sensor by observing the pictograms 90M-90P. He may then switch the data acquisition onto a given sensor by means of the switch formed by the pictogram 90Q.

The display system 10 according to the invention is therefore particularly efficient for summarizing on a same additional screen 40A, 40B, a plurality of pieces of information dispersed over diverse windows which may be displayed on diverse screens 32A-32D of the main display means 30.

This summary is performed depending on the operation of the state of the aircraft, so that the display present on the additional screen 40A, 40B is adapted to the actions which have to be carried out by the crew in this operational state. The display system 10 is therefore particularly efficient and significantly simplifies the tasks of the crew.

While the foregoing is directed to embodiments of the present invention, other and further embodiments of the invention may be devised without departing from the basic scope thereof, and the scope thereof is determined by the claims that follow.

The invention claimed is:

1. A display system for an aircraft, comprising main display means including:
   at least one basic screen, and
   means for handling the graphic interface of said or each basic screen, the handling means being configured to separately display on the main display means at least one first display window and at least one second display window, each display window displaying at least one pictogram representative of a parameter and/or a control of the aircraft, wherein the system includes additional display means including:

at least one additional screen, and additional means for handling the graphic interface of the additional screen configured to display on the additional screen, a summary window depending on one of a transitional state between two air control centers, a preparation state for a descent phase towards a landing runway, a preparation state for entering an air control area with specific requirements, a detection of a deviation between two redundant sensors on the aircraft, a change in the navigation configuration, and a malfunction on the aircraft, the summary window comprising at least one first pictogram configured to be displayed on the first display window of the main display means without being displayed on the second display window of the main display means, and at least one second pictogram intended to be displayed on the second display window of the main display means without being displayed on the first display window of the main display means, said first and second pictograms displaying available data configured to and required for the one of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft.

2. The system according to claim 1, wherein the main display means comprise a first basic screen and a second basic screen, distinct and away from the first basic screen, the handling means being configured to display the first display window on the first basic screen, and to separately display the second window on the second basic screen.

3. The system according to claim 2, wherein the first basic screen is a primary piloting screen able to display pictograms representative of piloting parameters of the aircraft, the second basic screen being a multi-functional screen configured to display pictograms representative of the navigation of the aircraft and/or of the handling of systems of the aircraft.

4. The system according to claim 1, wherein the main display means comprise a first basic screen, the handling means being configured to display the first window on the first basic screen, and to display the second window on the first basic screen as a replacement of or an addition to the first window, advantageously upon interaction of a user with a control member of the display of the first basic screen.

5. The system according to claim 1, wherein the additional interface handling means are further configured to display in addition to the summary, window, a second summary window comprising a second set of pictograms stemming from two separate windows of the main display means in another of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft, the at least one first pictogram and at least one second pictogram of the summary window being different from the second set of pictograms.

6. The system according to claim 5, wherein the additional interface handling means comprise means for detecting the aircraft is currently experiencing the transitional state between two air control centers, the preparation state for a descent phase towards a landing runway, the preparation state for entering an air control area with specific requirements, the detection of a deviation between two redundant sensors on the aircraft, the change in the navigation configuration, or the malfunction on the aircraft, and automatic switching means configured to automatically switch the display onto the additional screen from the first summary window towards the second summary window depending on the transitional state between two air control centers, the preparation state for a descent phase towards a landing runway, the preparation state for entering an air control area with specific requirements, the detection of a deviation between two redundant sensors on the aircraft, the change in the navigation configuration, or the malfunction on the aircraft detected by the detection means.

7. The system according to claim 1, wherein the additional handling means are configured to selectively display in the one of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft, at least one first summary window and at least one first additional summary window, the auxiliary display means comprising a means for selection by a user of the first summary window and/or of the first additional summary window.

8. The system according to claim 1, wherein the additional interface handling means are configured to display on the additional screen a man/machine dialog interface, such as an alphanumerical keyboard.

9. The system according to claim 1, wherein the additional graphic interface handling means are configured to display on the additional screen, independently of the transitional state between two air control centers, the preparation state for a descent phase towards a landing runway, the preparation state for entering an air control area with specific requirements, the detection of a deviation between two redundant sensors on the aircraft, the change in the navigation configuration, or the malfunction on the aircraft currently experienced by the aircraft, at least one predefined window of pictograms representative of flight parameters and/or controls.

10. The system according to claim 1, wherein each pictogram is representative of a flight parameter and/or control selected from an alphanumerical or analog indicator of a flight parameter, a virtual button configured to actuate a control of a system of the aircraft, a short cut for accessing another window, a path for accessing documentation, or/and a field for inputting alphanumerical data.

11. The system according to claim 1, wherein the additional screen is a touchscreen, for example borne by a tablet, at least one pictogram displayed on the additional screen being configured to be tactilely selected by a user of the additional screen.

12. A display method for an aircraft, comprising the following steps: providing a system comprising main display means including:

at least one basic screen, and means for handling the graphic interface of said or each basic screen, the handling means being configured to separately display on the main display means at least one first display window and at least one second display window, each display window displaying at least one pictogram representative of a parameter and/or a control of the aircraft, wherein the system includes additional display means including:

at least one additional screen, and additional means for handling the graphic interface of the additional screen configured to display on the additional screen, a summary window depending on one of a transitional state between two air control centers, a preparation state for a descent phase towards a landing runway, a preparation state for entering an air control area with specific requirements, a detection of a deviation between two redundant sensors on the aircraft, a change in the navigation configuration, and a malfunction on the aircraft;

displaying the first display window on the at least one basic screen, the first display window displaying at least one pictogram representative of a parameter and/or a control of the aircraft;

displaying on the additional screen the summary window depending on the one of the transitional state between two air control centers, the preparation state for a descent phase towards a landing runway, the preparation state for entering an air control area with specific requirements, the detection of a deviation between two redundant sensors on the aircraft, a change in the navigation configuration, and the malfunction on the aircraft, the summary window comprising at least the first pictogram displayed on the first display window without being displayed on a second display window of the main display means and at least one second pictogram configured to be separately displayed on the second display window of the main display means, without being displayed on the first display window of the main display means, said first and second pictograms displaying available data configured to and required for the one of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft.

13. The display method according to claim 12, wherein in the one of the transitional state between two air control centers, the preparation state for a descent phase towards a landing runway, the preparation state for entering an air control area with specific requirements, the detection of a deviation between two redundant sensors on the aircraft, a change in the navigation configuration, and the malfunction on the aircraft, the additional interface handling means display a first summary window comprising a first set of pictograms stemming from two separate display windows of the main display means, and in that in another of the transitional state between two air control centers, the preparation state for a descent phase towards a landing runway, the preparation state for entering an air control area with specific requirements, the detection of a deviation between two redundant sensors on the aircraft, a change in the navigation configuration, and the malfunction on the aircraft, the additional interface handling means display a second summary window including a second set of pictograms stemming from two separate display windows of the main display means, the first set of pictograms being different from the second set of pictograms.

14. The method according to claim 12, wherein it includes the display of the first display window on a first basic screen of the main display means, and the separate display of the second display window on a second basic screen of the main display means, distinct from the first basic screen, the additional graphic interface handling means displaying on the additional screen a summary window comprising at least one first pictogram displayed on the first display window and at least one second pictogram displayed on the second display window.

15. The method according to claim 12, wherein the main display means display a first display window on a first basic screen, a second display window being configured to be displayed on the first basic screen by the graphic interface handling means as a replacement of or an addition to the first display window, the additional graphic interface handling means of the additional screen displaying on the additional screen, a summary window comprising a first pictogram displayed on the first display window of the main display means and a second pictogram intended to be displayed on the second display window of the main display means without being displayed on the first display window of the main display means.

16. A display system for an aircraft, comprising main display means including:

at least one basic screen, and means for handling the graphic interface of said or each basic screen, the handling means being configured to separately display on the main display means at least one first display window and at least one second display window, each display window displaying at least one pictogram representative of a parameter and/or a control of the aircraft, wherein the system includes additional display means including:

at least one additional screen, and additional means for handling the graphic interface of the additional screen configured to display at least a first summary window and a second summary window different from the first summary window on the additional screen depending on whether the aircraft is currently experiencing a transitional state between two air control centers, a preparation state for a descent phase towards a landing runway, a preparation state for entering an air control area with specific requirements, a detection of a deviation between two redundant sensors on the aircraft, a change in the navigation configuration, or a malfunction on the aircraft, each of the first summary and the second summary window corresponding to a different one of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft, each of the first and second summary windows comprising at least one respective first pictogram configured to be displayed on one of the display windows of the main display means without being displayed on a further one of the display windows of the main display means, and at least one respective second pictogram configured to be displayed on the further one of the display windows of the main display means without being displayed on the one display window of the main display means for displaying the at least one respective first pictogram, each of the respective first and second pictograms each displaying available data in the respective first and second summary window configured to and required for the corresponding one of the transitional state between two air control centers, the preparation state for a descent phase towards a landing runway, the preparation state for entering an air control area with specific requirements, the detection of a deviation between two redundant sensors on the aircraft, the change in the navigation configuration, and the malfunction on the aircraft.

* * * * *